(12) United States Patent
Sostawa et al.

(10) Patent No.: US 10,868,765 B2
(45) Date of Patent: Dec. 15, 2020

(54) SHAPING TRAFFIC ON PLCA-ENABLED 10SPE NETWORKS

(71) Applicant: Microchip Technology Incorporated, Chandler, AZ (US)

(72) Inventors: Bernd Sostawa, Eggenstein-Leopoldshafen (DE); Martin Miller, Karlsruhe (DE); Michael Rentschler, Karlsruhe (DE); Venkatraman Iyer, Austin, TX (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 0 days.

(21) Appl. No.: 16/183,850

(22) Filed: Nov. 8, 2018

(65) Prior Publication Data

US 2019/0363991 A1    Nov. 28, 2019

Related U.S. Application Data

(60) Provisional application No. 62/676,778, filed on May 25, 2018.

(51) Int. Cl.
| | |
|---|---|
| *H04L 12/815* | (2013.01) |
| *H04L 12/823* | (2013.01) |
| *H04L 12/851* | (2013.01) |
| *H04L 12/54* | (2013.01) |
| *H04L 12/70* | (2013.01) |

(52) U.S. Cl.
CPC ........ *H04L 47/225* (2013.01); *H04L 12/5601* (2013.01); *H04L 47/24* (2013.01); *H04L 47/32* (2013.01); *H04L 2012/568* (2013.01); *H04L 2012/5679* (2013.01)

(58) Field of Classification Search
CPC ... H04L 12/5601; H04L 47/225; H04L 47/24; H04L 47/32; H04L 2012/5679; H04L 2012/568

See application file for complete search history.

(56) References Cited

U.S. PATENT DOCUMENTS

| | | | |
|---|---|---|---|
| 5,361,063 A | 11/1994 | Jaffe et al. | 370/447 |
| 2002/0133589 A1* | 9/2002 | Gubbi | H04L 47/788 |
| | | | 709/225 |
| 2003/0026267 A1* | 2/2003 | Oberman | H04L 47/10 |
| | | | 370/397 |
| 2003/0086385 A1* | 5/2003 | Kwon | H04L 1/0041 |
| | | | 370/320 |
| 2003/0108059 A1* | 6/2003 | Yew | H04L 47/70 |
| | | | 370/443 |

(Continued)

OTHER PUBLICATIONS

"IEEE Std 802.3-2015"; Sep. 2015 (Year: 2015).*

(Continued)

*Primary Examiner* — Benjamin H Elliott, IV
(74) *Attorney, Agent, or Firm* — Slayden Grubert Beard PLLC

(57) ABSTRACT

A 10SPE network node includes a processor, a memory, instructions in the memory configured to cause the processor to generate data to be sent to other nodes, and a network stack. The network stack includes circuitry configured to delay transmission of data in a sending slot in a transmission cycle on a 10SPE network based upon a bandwidth sharing scheme.

16 Claims, 9 Drawing Sheets

(56) References Cited

U.S. PATENT DOCUMENTS

| | | | | |
|---|---|---|---|---|
| 2007/0271401 | A1* | 11/2007 | Louzoun | G06F 13/26 |
| | | | | 710/264 |
| 2013/0016724 | A1* | 1/2013 | Thaler | H04L 47/245 |
| | | | | 370/393 |
| 2016/0182394 | A1* | 6/2016 | Kiessling | H04L 29/06884 |
| | | | | 370/230 |
| 2019/0166062 | A1* | 5/2019 | Verbree | H04L 47/6215 |
| 2019/0261420 | A1* | 8/2019 | Pannell | H04L 1/0041 |
| 2019/0313446 | A1* | 10/2019 | Kim | H04W 4/48 |
| 2019/0363991 | A1* | 11/2019 | Sostawa | H04L 12/40156 |
| 2020/0136857 | A1* | 4/2020 | Yun | H04L 12/40039 |

OTHER PUBLICATIONS

Pannell, Don, "Quality of Service for PLCA," IEEE Draft, vol. 802.1, No. v02, URL: grouper.ieee.org/groups/802/1/files/public/docs2018/new-TSN-pannell-QoS-for-PLCA-0518-v02.pdf, 37 pages, May 24, 2018.

International Search Report and Written Opinion, Application No. PCT/US2019/033204, 14 pages, dated Aug. 14, 2019.

* cited by examiner

SHAPING TRAFFIC ON PLCA-ENABLED 10SPE NETWORKS

PRIORITY

This application claims priority to U.S. Provisional Patent Application No. 62/676,778 filed May 25, 2018, the contents of which are hereby incorporated by reference in their entirety.

TECHNICAL FIELD

The present disclosure relates to Ethernet communications and, more particularly, to shaping traffic on PHY layer collision avoidance (PLCA) enabled networks following the IEEE 802.3cg standard, also known as Single Twisted Pair Ethernet, 10SPE, or 10BASE-T1S.

BACKGROUND

10SPE is a proposed standard currently under revision and development. 10SPE defines Ethernet local area, access and metropolitan area networks. Ethernet is specified at selected speeds of operation; and uses a common media access control (MAC) specification and management information base (MIB). The Carrier Sense Multiple Access with Collision Detection (CSMA/CD) MAC protocol specifies shared medium (half duplex) operation, as well as full duplex operation. Speed specific Media Independent Interfaces (MIIs) provide an architectural and optional implementation interface to selected Physical Layer entities (PHY). The Physical Layer encodes frames for transmission and decodes received frames with the modulation specified for the speed of operation, transmission medium and supported link length. Other specified capabilities include: control and management protocols, and the provision of power over selected twisted pair PHY types.

10SPE specifies additions to and appropriate modifications of IEEE Std. 802.3 to add 10 Mb/s Physical Layer (PHY) specifications and management parameters for operation, and associated optional provision of power, on single balanced twisted-pair copper cabling.

SUMMARY

Embodiments of the present disclosure may include a 10SPE network node. The nod may include a processor, a memory, and instructions in the memory configured to cause the processor to generate data to be sent to other nodes. The node may include a network stack including circuitry configured to send the data in one or more transmission cycles. A given transmission cycle may include a least one send slot for each of the 10SPE network nodes to send data. The circuitry may be further configured to delay transmission of data in a first send slot in a first transmission cycle until a second send slot based upon a bandwidth sharing scheme. In combination with any of the above embodiments, the circuitry may be further configured to delay transmission of data in the first sending slot based upon a count of transmission cycles. In combination with any of the above embodiments, the circuitry may be further configured to delay transmission of data in the first sending slot based upon a count of sending slots for the 10SPE network node. In combination with any of the above embodiments, the circuitry may be further configured to delay transmission of data in the first sending slot based upon a credit accounting scheme, wherein sending data costs a plurality of credits and credits accrue over time. In combination with any of the above embodiments, the transmission cycle may include a plurality of send slots of the 10SPE network. In combination with any of the above embodiments, the first send slot and a second slot may be of different sizes. In combination with any of the above embodiments, the circuitry may be further configured to delay transmission of data in the first send slot until the second send slot based upon another 10SPE network node previously sending data. In combination with any of the above embodiments, the circuitry may be further configured to delay transmission of data in the first send slot until the second send slot based upon the 10SPE network node having a lower priority than one of the other nodes. In combination with any of the above embodiments, the instructions may be further configured to cause the processor to a delay of transmission of data in a first send slot in a first transmission cycle until the second send slot based upon a determination of inactivity by the other nodes. In combination with any of the above embodiments, the circuitry may implemented by instructions to be executed by the processor.

Embodiments of the present disclosure may include an article of manufacture. The article may include instructions that, when loaded and executed by the processor, implement the operation of the circuitry of any of the above embodiments.

Embodiments of the present disclosure may include an electronic device, computer, network card, mobile device, or server including any of the nodes of the above embodiments. Embodiments of the present disclosure may include a network including two or more nodes of any of the above embodiments.

Embodiments of the present disclosure may include methods performed by any of the nodes, instructions when executed, circuitry, electronic devices, computers, network cards, mobile devices, networks, or servers of the above embodiments.

DETAILED DESCRIPTION

Figure 1:
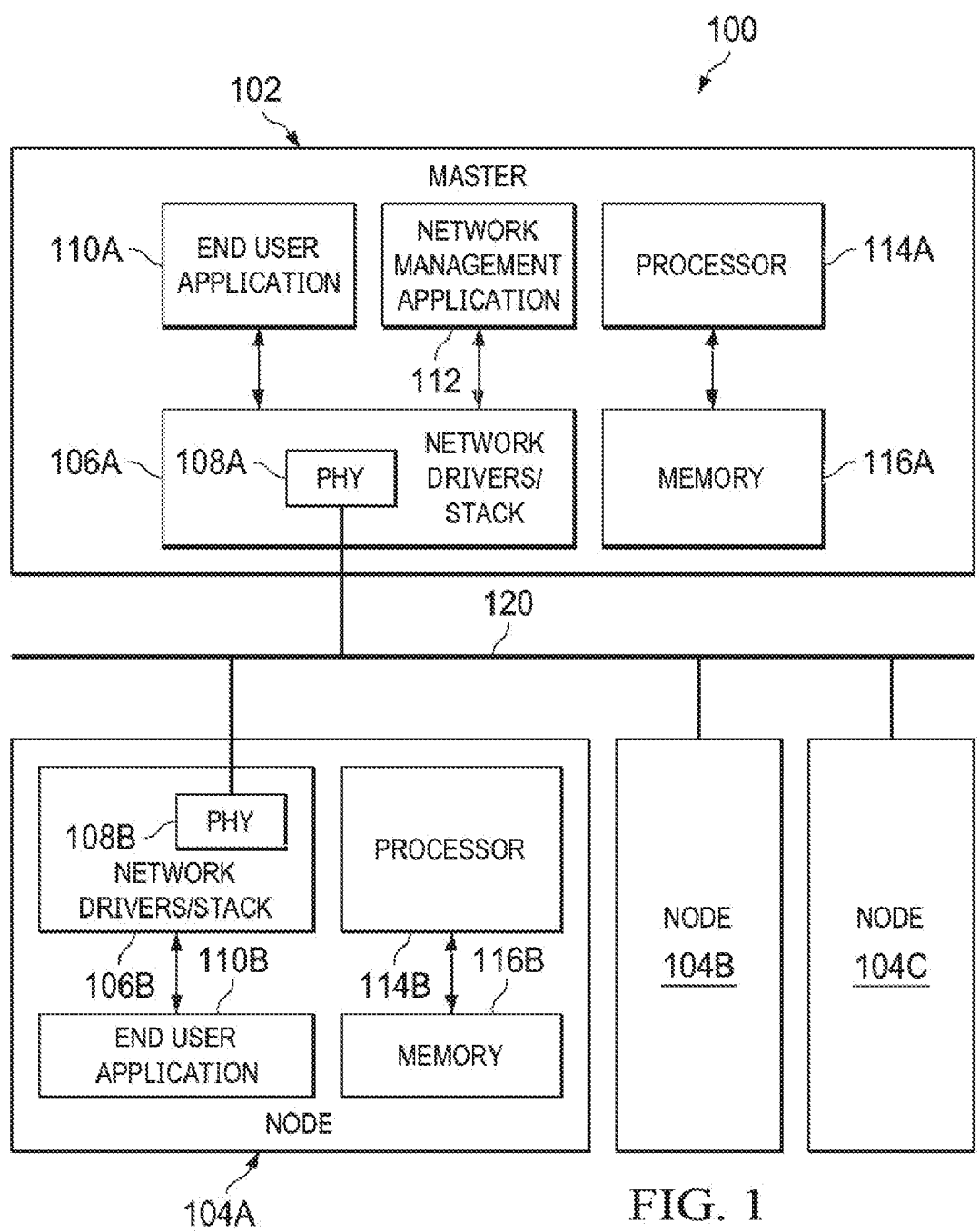
FIG. 1 is an illustration of example 10SPE network, according to embodiments of the present disclosure.

FIG. 1 is an illustration of an example 10SPE network 100, according to embodiments of the present disclosure. Network 100 may include any suitable number and kind of nodes. For example, network 100 may include nodes 102, 104A, 104B, 104C. These nodes may be configured to communicate with each other over a network 120. Network 120 may be implemented in any suitable manner.

Node 102 may be a master node. Node 102 may act as a master node by performing network allocation, assignments, or other management tasks on behalf of other nodes in the network. Such tasks may be performed with node 102 by a network management application 112.

Nodes 102, 104A, 104B, 104C may each be implemented with network drivers or a stack 106. Stack 106 may include a PHY layer 108. Nodes 102, 104A, 104B, 104C may each be implemented with one or more end user applications 110, processors 114, and memories 116. End user applications 110, network management application 112, and network drivers or stacks 106 may include software, libraries, functions, scripts, applications, code, or other instructions for execution by processors 114. The instructions may be stored on respective memories 116. The instructions, when executed by processors 114, may cause user applications 110, network management application 112, and network drivers or stacks 106 to perform the functionality of the present disclosure. Memories 116 may be implemented by one or more memory elements of any suitable implementation, whether long-term or short-term storage. Processors 114 may be implemented by one or more of any suitable processor, core, or microcontroller.

Nodes 102, 104A, 104B, 104C may implement any suitable electronic device, such as a computer, laptop, server, virtual machine, mobile device, or automotive electronic control unit (ECU). Nodes 102, 104A, 104B, 104C may each include different implementations of end user applications 110. End user applications 110 may require communication with others of end user applications 110 or others of nodes 102, 104A, 104B, 104C. Such communication may be performed, for example using 10SPE over network 120.

Although a certain number of nodes are shown in FIG. 1, network 100 may include any suitable number and combination of 10SPE-enabled nodes.

Each node may be configured to perform traffic shaping. In one embodiment, such shaping may be performed in hardware using digital logic. In another embodiment, hooks may be implemented in hardware of each node so that firmware can also observe and shape traffic. Shaping traffic may be performed to enforce bandwidth fairness or prioritization for time-sensitive nodes.

Communication between nodes 102, 104A, 104B, 104C may be performed using transmission cycles and frames shown in the following features. Each of nodes 102, 104A, 104B, 104C may be configured to communicate with each other using frames that conform the following embodiments.

Figure 2:
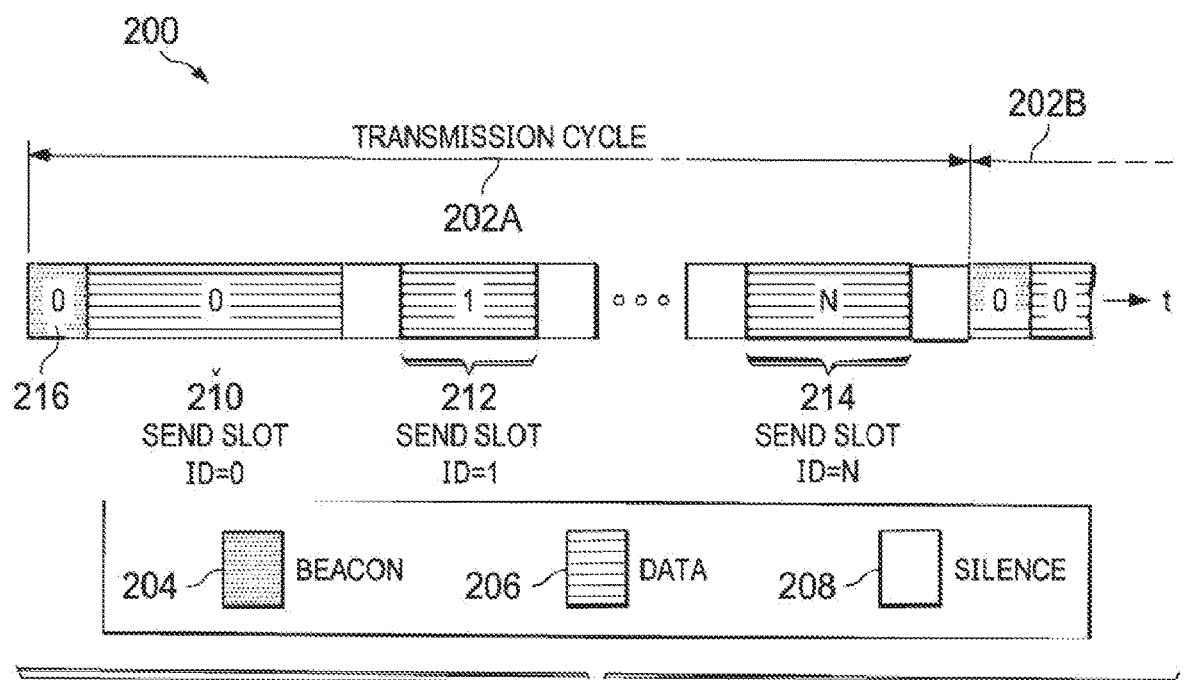
FIG. 2 is an illustration of an example transmission cycle, according to embodiments of the present disclosure.

FIG. 2 is an illustration 200 of example transmission cycle, according to embodiments of the present disclosure. The transmission cycle may be for network 100 of FIG. 1.

A first instance of a transmission cycle, 202A, may include send slots for each node of the network. If N nodes are in the network, N send slots may be included in a given transmission cycle. For example, transmission cycle 202A may include send slots 210, 212, 214. Each such send slot may be assigned to a given node. The send slot may be identified with an identifier (0 . . . N-1) that is unique for the transmission cycle. The identifier may identify a sender of the data packet. Each send slot may include up to a certain amount of data 206. As discussed further below, in some embodiments an assigned send slot might not have any data. The identifier may be included in data 206. The identifier may identify a sender of the data. In various embodiments, the send slot may be omitted for a given node under conditions discussed in further detail below. Send slots 210, 212, 214 may be separated by a period of silence 208. Each transmission cycle 202 may be initiated by a beacon 204. Beacon 204 may include a suitable piece of information to indicate that transmission cycle is beginning. Transmission cycle 202A may end and another transmission cycle 202B may begin. The participation by individual nodes in a given transmission cycle 202 may vary between transmission cycles.

Upon receipt of transmission cycle 202, a given node may parse it. Beacon 216 may be analyzed to determine that transmission cycle 202. Silence 208, or the absence of data, may be interpreted to determine that a separate data portion of transmission cycle 202 is to be received next. Data 206 may be analyzed to determine if data to or from a given node is included. The given node may insert its own data 206 into transmission cycle.

The transmission cycle may reflect use of PLCA to shape traffic in the network. PLCA may be specified in IEEE P802.3cg. PLCA may provide access fairness to nodes in the network. Access fairness may include the ability of each node to access the network in a given transmission cycle 202. However, PLCA does not provide bandwidth fairness or prioritization among the nodes. Bandwidth fairness might not be provided because, even though access fairness is provided, given nodes may insert more data into their packets than other nodes. Furthermore, access fairness cannot provide any prioritization among nodes. Embodiments of the present disclosure may provide bandwidth fairness and prioritization among the nodes. PLCA and enhancements thereof may be implemented in digital logic or instructions for execution in a network stack. PLCA and enhancements thereof may include hooks for firmware to observe and shape traffic.

With most implementations of a collision-based network, a maximum bandwidth utilization may be only 60%. Furthermore, without deterministic behavior, it might not be used for safety-critical applications. Instead, with PLCA, a master node, such as node 102, may organize network access on the physical layer. This may prevent collisions, provide deterministic behavior, and fully use bandwidth.

In FIG. 2, each PHY of respective nodes may be assigned a static ID (0 . . . N-1) included in data 206. The master node may have an ID of "0". The master node may send a beacon 204 starting a new transmission cycle. Upon receipt, each of the other nodes may have the opportunity to send data within a respective send slot 210, 212, 214 through respective PHY hardware or software. In one embodiment, a node may pass or yield the opportunity to send data in a respective send slot 210, 212, 214. Other nodes may be configured to recognize that the given node has skipped its opportunity to send data if silence 208 exceeds a given threshold. Then, the next send slot may begin.

Figure 3:
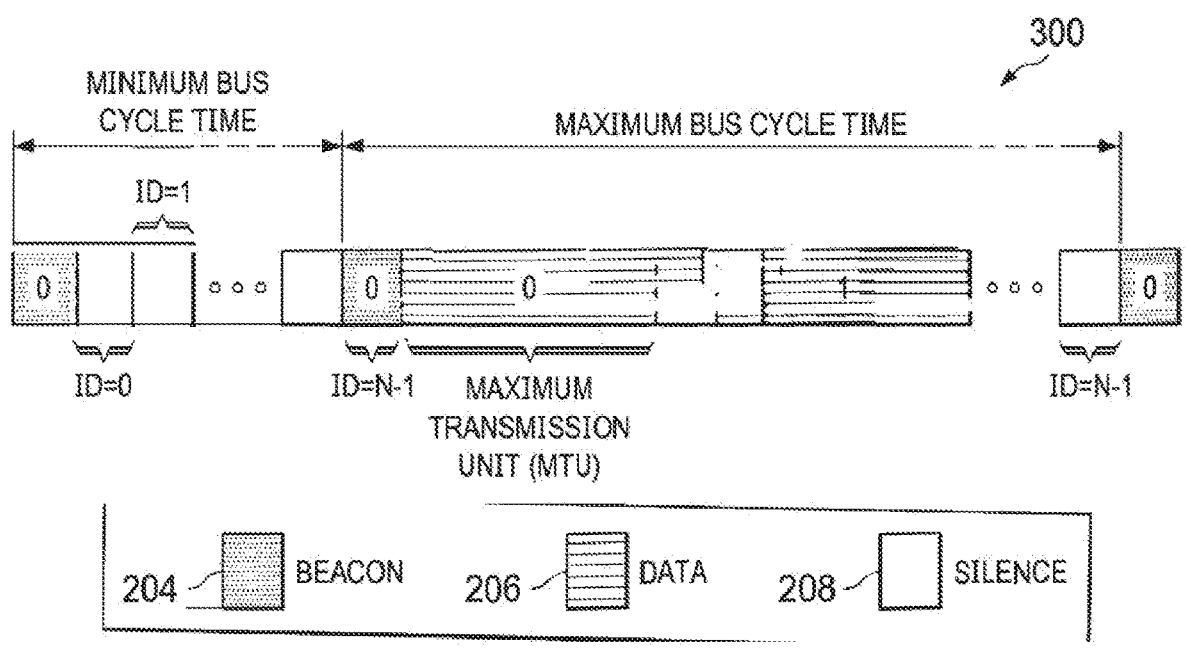
FIG. 3 is an illustration of timing of an example transmission cycle, according to embodiments of the present disclosure.

FIG. 3 is an illustration 300 of timing of an example transmission cycle, according to embodiments of the present disclosure. The minimum and maximum time to complete a transmission cycle or bus cycle can be calculated.

The minimum time needed to complete a complete transmission cycle may be given as Minimum Bus Cycle Time=$t$Beacon+$N*t$Silence wherein tBeacon is the time needed for a beacon to be issued, tSilence is the time needed for silence between a pair of send slots, and N is the number of nodes or send slots. Such a minimum time would occur if all nodes yielded their opportunity to use their respective send slots.

The maximum time needed to complete a complete transmission cycle may be given as Maximum Bus Cycle Time=$t$Beacon+$N*t$Silence+ $N*t$MTU wherein tBeacon is the time needed for a beacon to be issued, tSilence is the time needed for silence between a pair of send slots, tMTU is time required to send the longest allowed data length (MTU—maximum transmission unit), N is the number of nodes or send slots. Such a maximum time would occur if all nodes used the maximum time between send slots to send its data (thus taking the full amount of silence), all nodes used their send slots to send data, and all nodes sent the maximum amount of data in their respective send slots. In one embodiment, an MTU may be 64 bytes long. The silence timeout periods may be included in this calculation because a given node might wait the duration of the silence timeout period, less (for example) a nanosecond, before sending.

Embodiments of the present disclosure may provide improvements over PLCA by allowing nodes with larger packets, bandwidth-overconsumption, lower priority, or best-effort traffic to yield transmit opportunities (TO) in various transmission cycles. Furthermore, embodiments of the present disclosure may provide improvements over PLCA by providing nodes with time-sensitive traffic to receive more transmission opportunities. Policies for individual nodes to yield TOs may be set by a master node and implemented by individual nodes. Policies for providing nodes with more transmission opportunities may be provided by a master node by assigning multiple identifiers to a single node.

In one embodiment, nodes may yield TOs according to an application controlled PLCA (ACP) scheme. In another embodiment, nodes may yield TOs according to an application controlled time division multiplexing algorithm (ACT). In yet another embodiment, nodes may yield TOs according to a credit-based shaping (CBS) scheme. In a further embodiment, ACP or ACT may be implemented using a CBS scheme.

Figure 4:
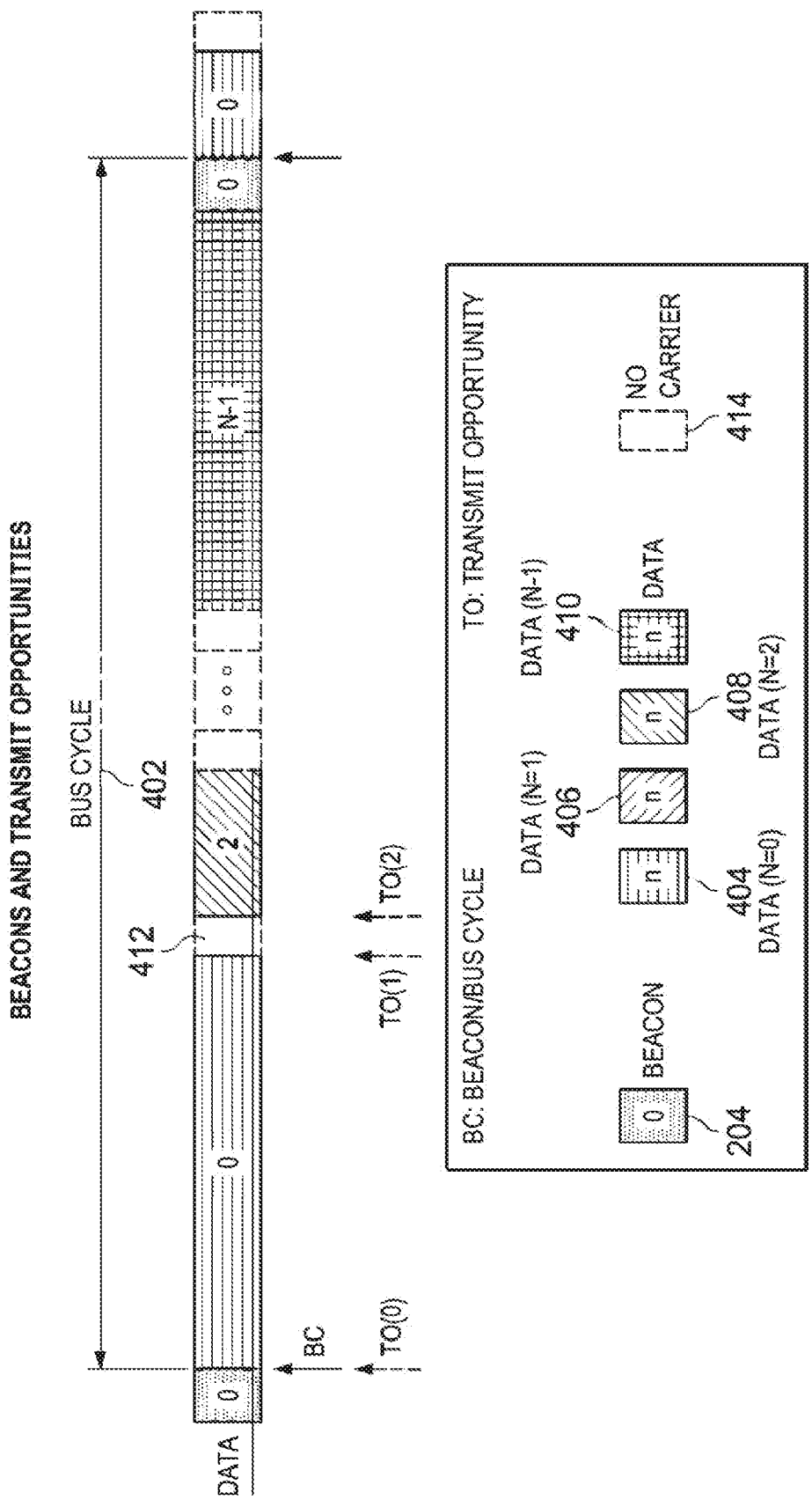
FIG. 4 is an illustration of a transmission or bus cycle wherein a given node does not take its transmission opportunity, according to embodiments of the present disclosure.

FIG. 4 is an illustration of a transmission or bus cycle 402 wherein a given node does not take its transmission opportunity, according to embodiments of the present disclosure. A beacon 204 may be issued in transmission cycle 402. Node 0 may take its TO, transmitting data 404. Node 1 might not take its TO, thus not transmitting data 406, leaving only silence 412. After silence 412 elapses for a maximum silence period, Node 2 may take its TO, transmitting data 408. Later, node N-1 may take its TO, transmitting data 410. Silence 414 may occur between various send slots. Another cycle may begin, starting with beacon 204 from the master node.

Figure 5:
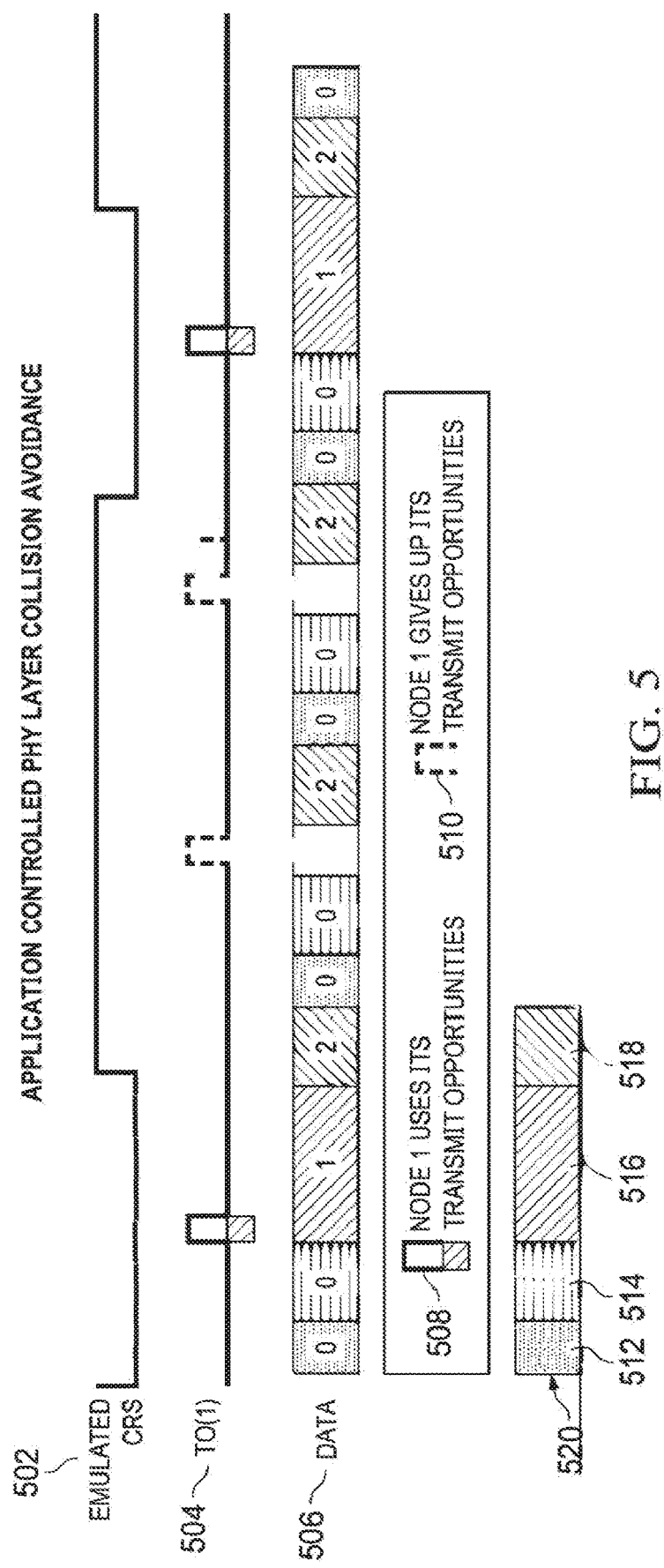
FIG. 5 is an illustration of a node not taking its transmission opportunity according to an ACP scheme, according to embodiments of the present disclosure.

FIG. 5 is an illustration of a node not taking its transmission opportunity according to an ACP scheme, according to embodiments of the present disclosure.

In ACP, a given node that is to be delayed may wait for a certain number of transmit opportunities before actually using the sending slot. If a given node is assigned a single identifier, then this technique may be similar to ACT except for an offset of time. However, if a given node is assigned multiple identifiers, then the given node may pass an ACP waiting period faster than another node that was assigned a single identifier. Such multiple identifiers may yield multiple send slots for a given node within a single transmission cycle.

An emulated carrier sense (CRS) 502 may be used as a bandwidth suppression signal. Emulated CRS 502 may emulate a carrier on the bus so that a given controller in a node believes that the bus is currently being used and the node will not transmit. Emulated CRS 502 may be generated locally for each node and may be used by software or circuitry on the node and issued to transmit hardware. Thus, when a given node is not to take its TO, the given node may issue emulated CRS 502 to its own equipment. Emulated CRS 502 may emulate an actual CRS signal line that is input to the hardware. Emulated CRS 502 may be logically OR'd with an actual CRS signal line.

A beacon 512 may be sent at the beginning of a transmission cycle 520. Data may be sent in send slots for node 0 (514), node 1 (516), and node 2 (518).

In FIG. 5, emulated CRS 502 may be shown for node 1 (516). When emulated CRS 502 is activated (for example, high), node 1 (516) may yield its TO as shown in 510. When emulated CRS 502 is de-activated (for example, low), node 1 (516) may take its TO as shown in 508. Thus, in FIG. 5 node 1 (516) may take its first TO, yield its next two TOs, and take its fourth TO.

Figure 6:
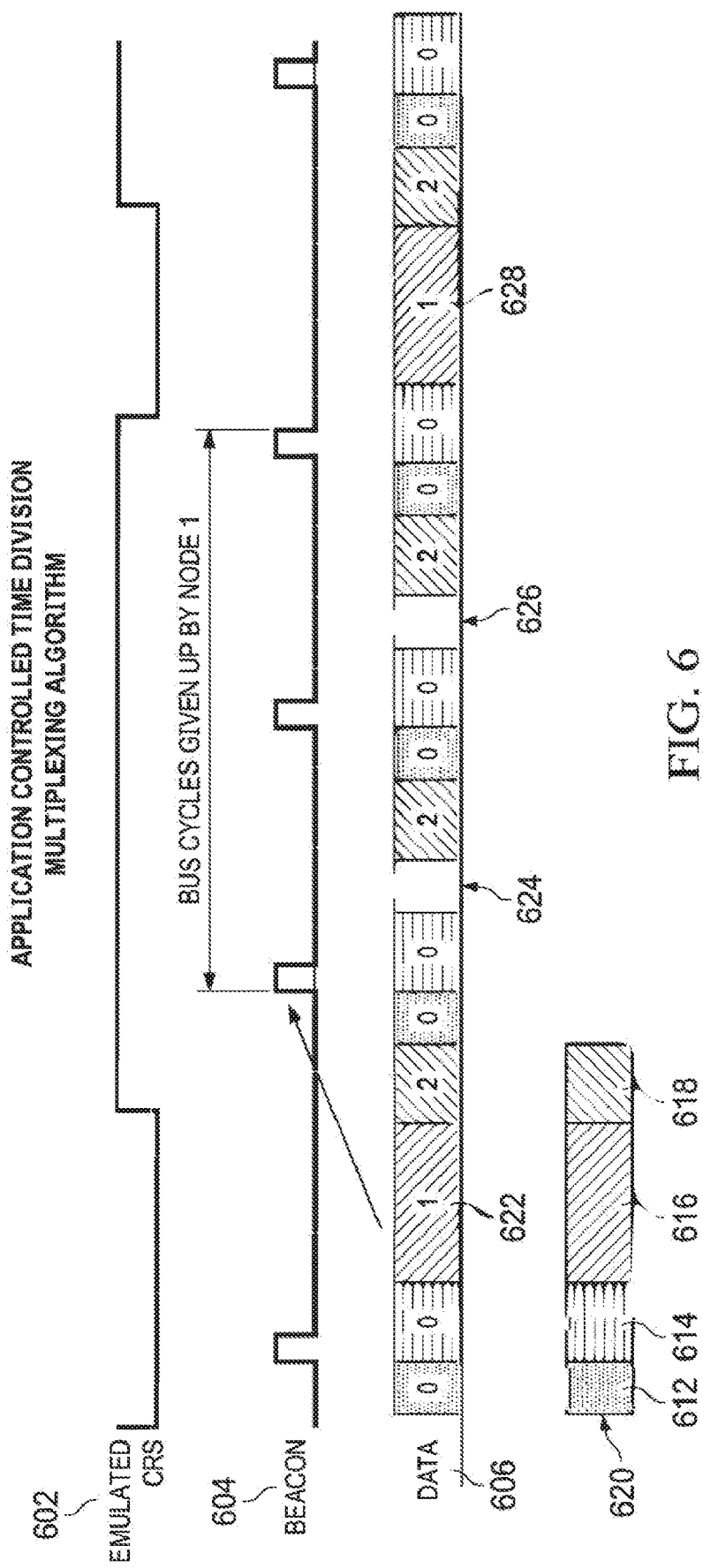
FIG. 6 is an illustration of a node not taking its transmission opportunity according to an ACT scheme, according to embodiments of the present disclosure.

FIG. 6 is an illustration of a node not taking its transmission opportunity according to an ACT scheme, according to embodiments of the present disclosure. A beacon 612 may be sent at the beginning of a transmission cycle 620. Data may be sent in send slots for node 0 (614), node 1 (616), and node 2 (618).

An emulated CRS 602 is be shown along with a beacon signal 604 corresponding to use of beacon 612 in a transmission cycle.

ACT may cause the node to wait until a certain number of beacons 604 have passed before transmitting again. ACT and ACP may be performed for a given node, for example, after the given node has sent a large packet, or if a node has lower priority traffic. In one embodiment, if no nodes in the network send in a given cycle, nodes may take the next TO, regardless of the bandwidth restrictions otherwise in place. Bandwidth suppression on a given node may be performed with emulated CRS 602. As described above, CRS may include a carrier signal on a bus so that portions of the node believe that the network or bus is unavailable, and data to be sent is delayed or held. Emulated CRS 602 may be used in combination with actual CRS signals.

In FIG. 6, once emulated CRS 602 is active (high) for, for example, node 1 then node 1 may yield its send slot 616 for a beacon 604 pulse. If emulated CRS 602 remains active, node 1 (616) may continue to yield its send slot 616 for another beacon 604 pulse. For example, data may be sent for node 1 in slots 622, 628, but omitted in slots 624, 626 wherein silence may be used instead.

If transmission cycle 620 included multiple send slots for node 1 in a single instance of the cycle, these multiple send slots would be yielded for a single beacon 604 pulse when CRT 602 is activated.

Figure 7:
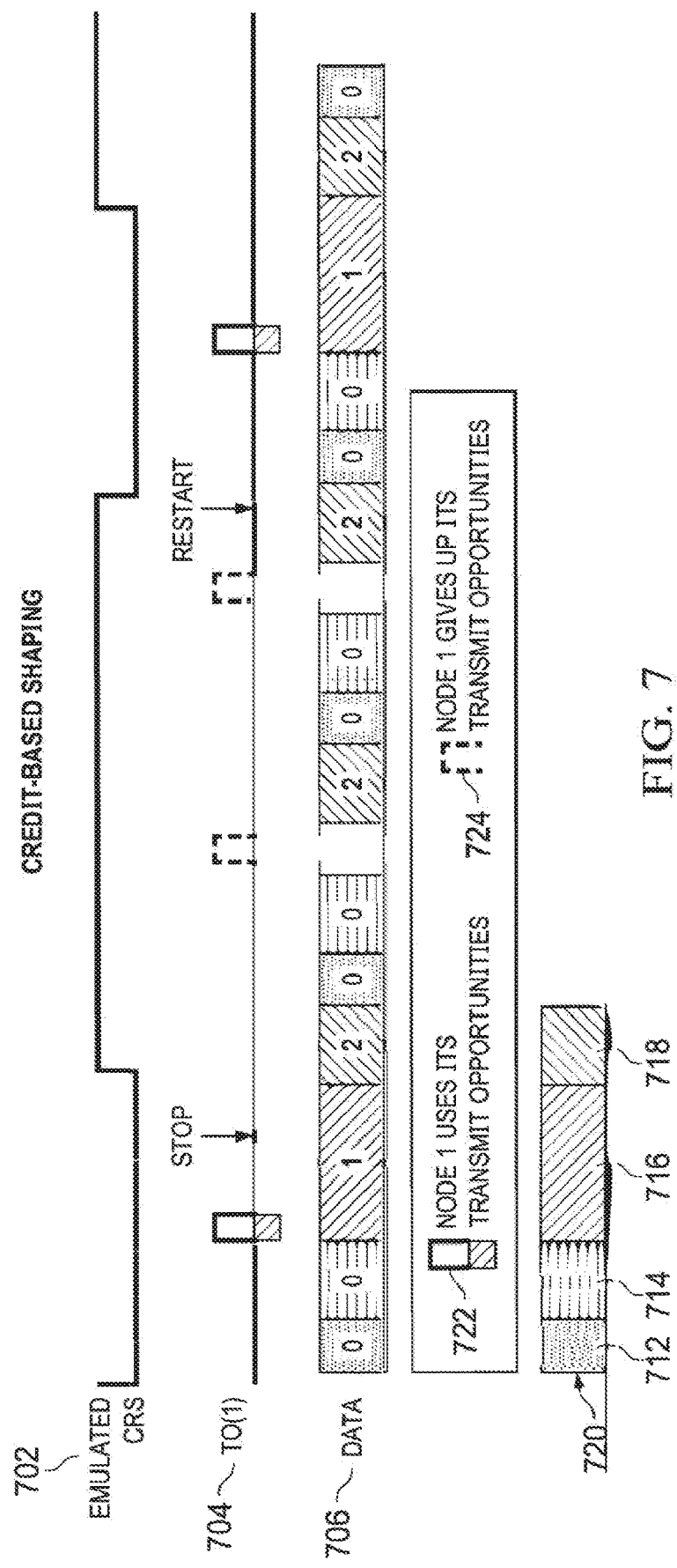
FIG. 7 is an illustration of a node not taking its transmission opportunity according to a CBS scheme, according to embodiments of the present disclosure.

FIG. 7 is an illustration of a node not taking its transmission opportunity according to a CBS scheme, according to embodiments of the present disclosure.

A CBS scheme may require a certain number of credits or other units in order for a given node to send its data in a respective send slot. The credits may accrue over time. Sending data may decrement a certain number of credits. A node may be initialized with an initial number of credits. Different nodes may be assigned a different number of initial credits, credit accrual rates, or cost of credits to send data.

A beacon 712 may be sent at the beginning of a transmission cycle 720. Data 706 may be sent in send slots for node 0 (714), node 1 (716), and node 2 (718). An emulated CRS 702 may be used to give effect a given node using its TO 722 or yielding its TO 724.

Figure 8:
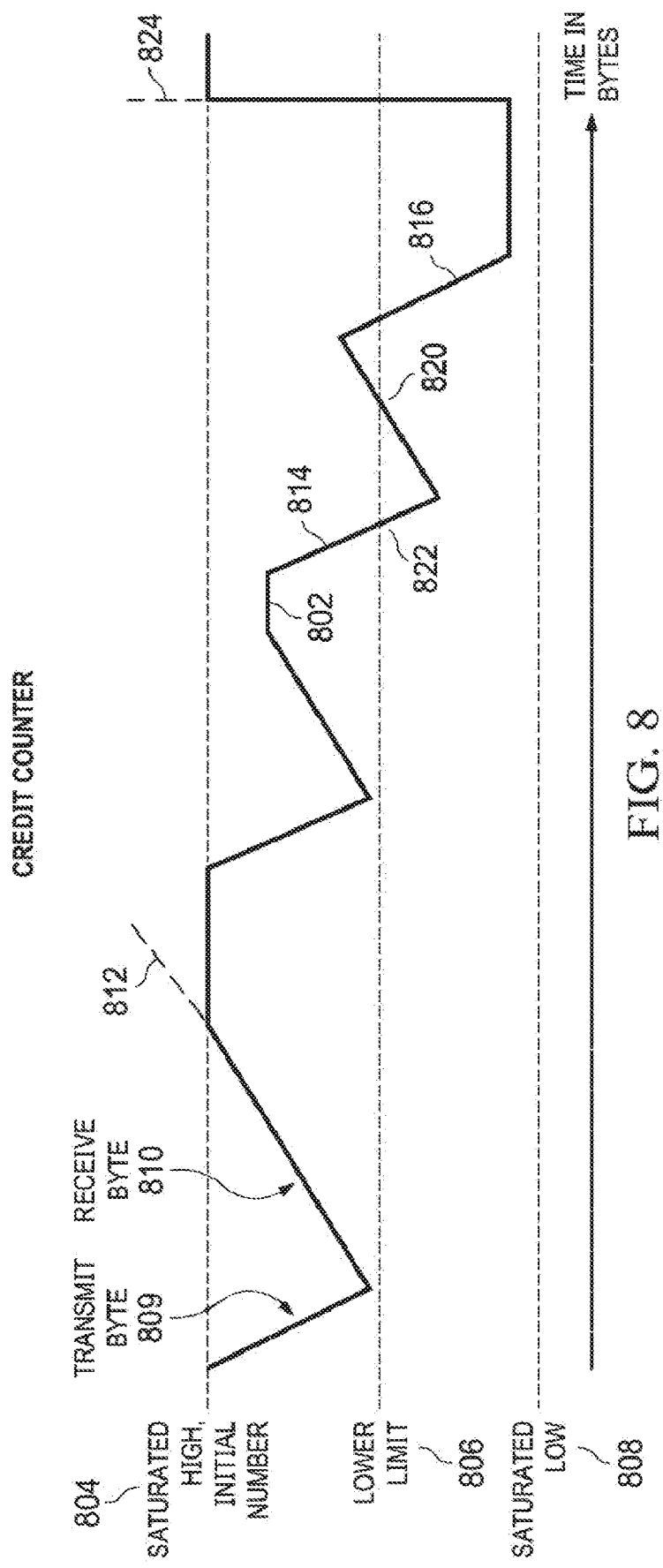
FIG. 8 is an illustration of credit values of the operation of FIG. 7, according to embodiments of the present disclosure.

FIG. 8 is an illustration of credit values of the operation of FIG. 7, according to embodiments of the present disclosure.

As discussed above, with CBS, the ability to send packets may be established through credits. If insufficient credits are available to send, then the node might not take a TO. Credits may replenish over time, or if there is low traffic usage on the network, they may be restored. Credits may be consumed when sending data.

Trace 802 may illustrate a value of a counter of credits for a given node over time. Time may be measured in total bytes sent or received at the node. Saturated high (SH) 804 may show a limit of the maximum number of credits that can be accrued. Transmit byte (TB) 806 may show a reduction in credits when the node sends data of a certain size. Receive byte (RB) 810 may show an increase in credits over time. For example, after sending a byte, it might take seven cycles to refill the credit needed to send the byte. In one embodiment, an initial number (IN) of credits may be set to SH 804. Trace 812 reflects the continued slope or rise of credits for trace 802 if SH 804 was not present.

Lower limit (LM) 806 may show a limit which, when trace 802 reaches LM 806, sending additional bytes might be suppressed or delayed. Suppression or delay might be performed by emulated CRS. In one embodiment, a node might be allowed to finish a packet that is in the middle of being transmitted before additional sending is suppressed, once LM 806 is reached. This is shown at, for example, 814, 816.

Saturated low (SL) 808 may represent a minimum number of credits, below which sending additional credits will not be held against the node in bandwidth sharing. SL 808 may be reached, for example, if a particularly large data segment is sent while trace 802 (representing credit) is barely above LM 806, thus allowing a data packet 816 to be sent. SL 808 may thus represent an absolute minimum. For example, trace 802 (representing credit) might not be allowed to have a negative amount of credits. In another example, trace 802 (representing credit) might not be penalized further than SL 808. Flat portions of trace 802 may represent that credit is constant as there is no traffic on the bus (i.e., silence). Hence credits would not increase or decrease in such a situation if credits are not being accumulated.

As trace 802 (representing credit) rises above LM 806, data might once again be set. For example, at 822, sending may be disabled, but once a data packet has finished and the node recovers credits over time, at 820, sending may be enabled again.

Trace 802 and the number of credits may be reset to IN in certain circumstances. For example, if the bus has been empty for an entire transmission cycle, trace 802 (representing credit) may be set to IN credit value. In another example, if other (but not all) nodes yield their TO within a transmission cycle, trace 802 (representing credit) may be set to IN.

A given node can be assigned a higher or lower priority by, for example, raising or lowering SH 804 or IN, decreasing or increasing the size of TB 809, increasing or decreasing RB 810, lowering or raising LM 806, or raising or lowering SL 808. Furthermore, a given node can be assigned a higher priority by restoring its credit count to IN upon more conditions. A given node can be assigned a lower priority by restoring its credit count to IN upon fewer conditions. For example, a given node can be lowered in its priority by requiring two empty transmission cycles to restore the credit count to IN, or raised in its priority by restoring the credit count if one or more other nodes have yielded their TOs within a transmission cycle.

In one embodiment, CBS can be used to implement ACP or ACT. For example, taking a TO may deduct a certain number of credits, or yielding a TO may be worth a certain number of regenerated credits. In another example, the passing of a transmission cycle may be worth a certain amount of regenerated credits, or the regeneration rate may be related to the length of the transmission cycle. In yet another example, receipt of a beacon may be used to regenerate a certain amount of credits.

Fair-share bandwidth allocation may be performed by ACP, ACT, or CBS implementing ACP or ACT. For example, if a given node has lower-priority, best effort data to be sent, or has recently sent large packets, the given node may count the number of slots that it has received and the number of beacons that it has received. Such a lower priority node may be restricted to sending only one data packet for every, for example, two, three, or more beacons that it receives. Similarly, a lower priority node may be restricted to sending one data packet for every, for example, two, three, or more sending slots that are available. These counts may be implemented by pure counts in ACP or ACT, or translated into a credit scheme for CBS implementing ACP or ACT.

A master node may assign priority to various nodes based upon existing traffic, traffic trends, data usage, user settings, or any other suitable policy. Furthermore, a given node may determine its own priority based upon these factors. The specific values used for various aspects of ACP, ACT, or CBS may be determined by the master node but implemented by the respective nodes. The respective nodes may implement the policies by interfacing software with firmware or network hardware.

Figure 9:
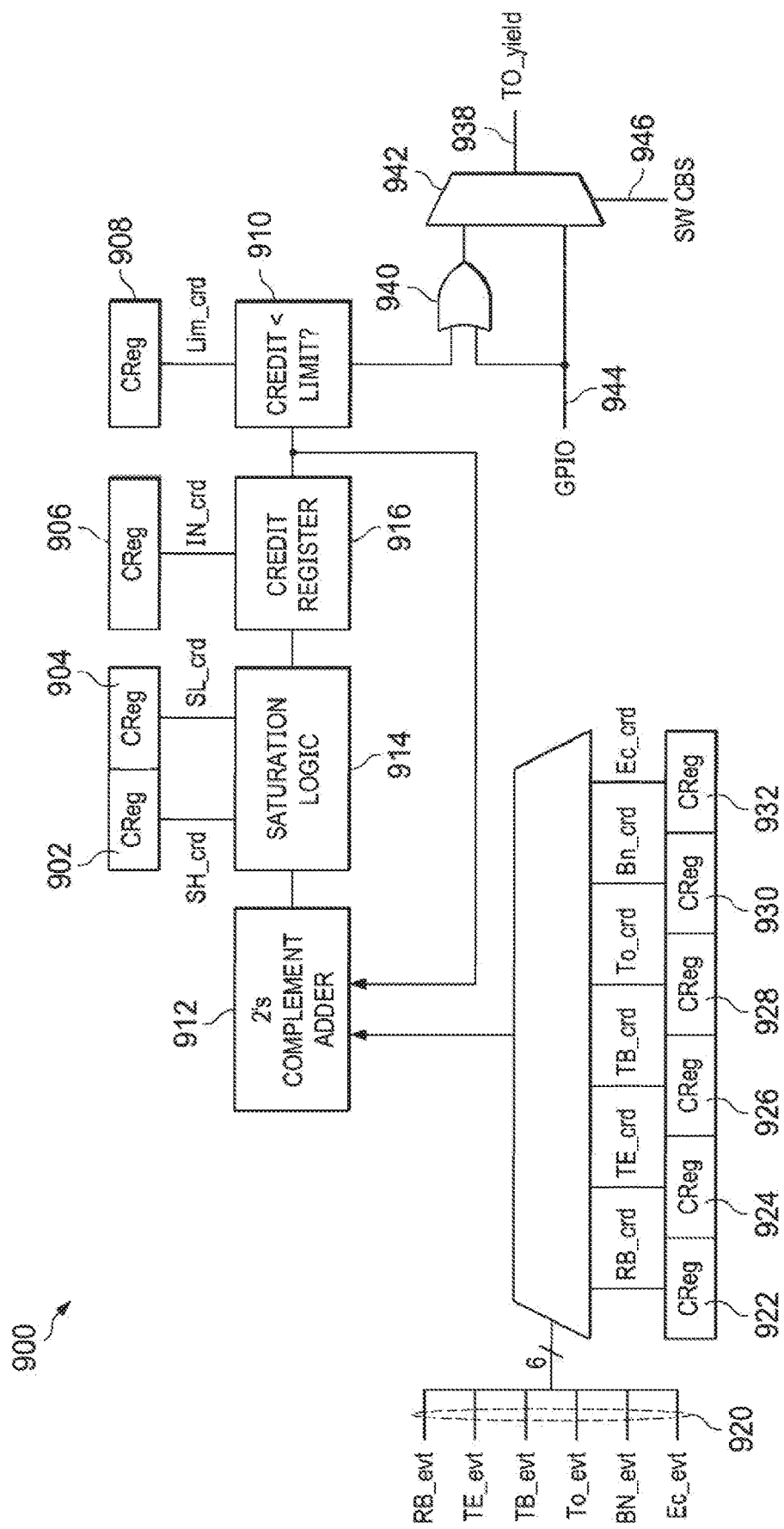
FIG. 9 is an illustration of digital circuitry to implement a credit scheme, according to embodiments of the present disclosure.

FIG. 9 is an illustration of a circuit 900 to implement a CBS scheme, according to embodiments of the present disclosure. An instance of circuit 900 may be implemented in each node.

Various events 920 may be received by circuit 900. These events may include RB (Receive byte), TE (transmit packet end), BN (beacon), TB (Transmit byte), TO (transmit opportunity), EC (empty cycle) events. Registers 922, 924, 926, 928, 930, 932 may include credit values, positive or negative, associated with a given event. The value of the given event may be provided to an adder circuit 912, which may accumulate values and provide its results into saturation logic 914. Saturation logic 914 may be configured to read values from registers 902, 904 for values of SH and SL, and limit credit movement to be between these values. Credit logic 916 may be configured to reinstate an IN value of credits upon interrupts, initialization, high priority messages, increase in priority of the node, or other criteria.

A credit value generated by credit logic 916 may be compared at 910 against a threshold stored in register 908, below which a TO may be yielded.

Decision 938 may be made instead with software or firmware. Received byte, transmission events, transmit bytes, TOs, beacons, and other events may be counted and reported to software. Software can use these values to determine if transmit opportunities should be yielded. This can be communicated by a GPIO pin as shown in 934. Such firmware may be implemented by instructions for execution by a processor or microcontroller.

In addition, decision 938 might be made with a combination of firmware and hardware. For example, output of circuit 900 may be evaluated against a message received that the given node is to send high-priority data. In such a case, a decision 938 to yield the TO may be overridden by firmware or software. In another example, output of circuit 900 may be evaluated against a determination that the transmission bus has not been utilized by other nodes. If the transmission bus has not been utilized by other nodes, a decision 938 to yield the TO may be overridden by firmware or software.

Output of logic 910 may be OR'd with a GPIO pin 934. GPIO pin 934 may reflect whether messages for forcing a packet or overriding a packet have been received. The output of OR gate 940 may itself be multiplexed with GPIO pin 934 based upon a software signal 946 to ignore logic 910 and to use GPIO pin 934 alone. Output of multiplexer 942 may yield decision 938.

Figure 10:
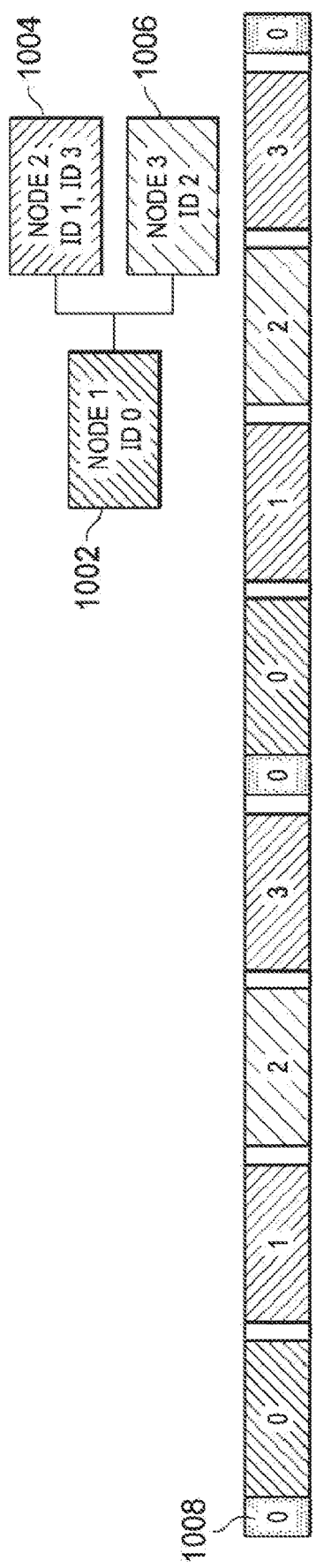
FIG. 10 is an illustration of assigning more than one identifier to a given node, according to embodiments of the present disclosure.

FIG. 10 is an illustration of assigning more than one identifier to a given node, according to embodiments of the present disclosure.

Node 1 (1002) may be assigned send slot 0. Node 2 (1004) may be assigned send slots 1 and 3. Node 3 (1006) may be assigned send slot 2. Thus, node 2 (1004) may be given more opportunities for a TO than node 3 (1006). These additional send slots may be independent of or used in conjunction with ACT, ACP, or CBS. A beacon 1008 may start each transmission cycle.

Figure 11:
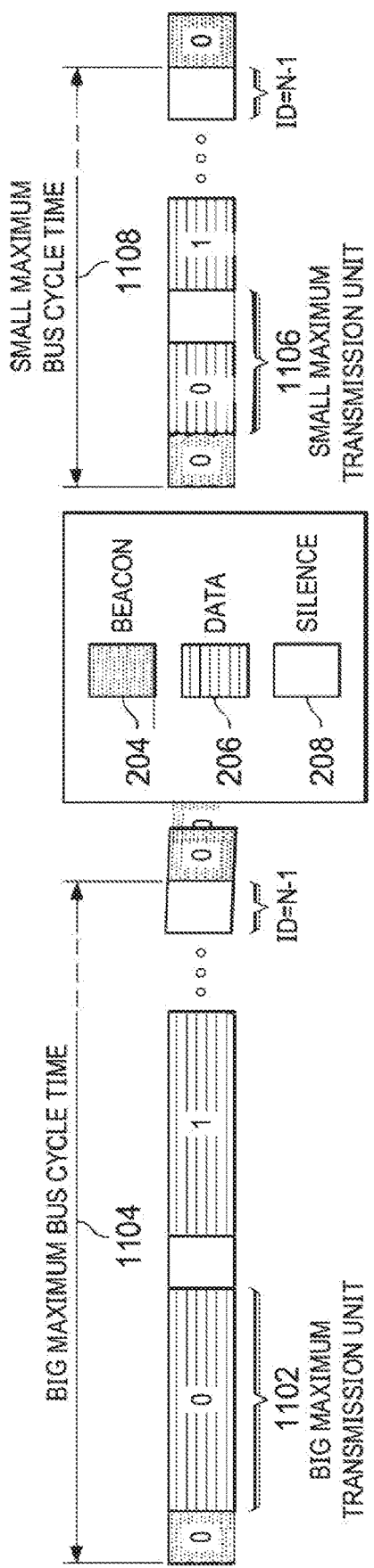
FIG. 11 is an illustration of multiple sizes of data transmission, according to embodiments of the present disclosure.

In this scheme, a node that has higher priority, or needs opportunities for higher priority that may be nonetheless omitted, may be assigned multiple PLCA identifiers for send slots FIG. 11 illustrates different sizes of data transmission, according to embodiments of the present disclosure. Two example, relative MTU sizes are shown. A "big" MTU may be a standard-sized MTU, while a shortened MTU may be, for example, half, or one-quarter of the time of a standard MTU. More permutations and comparatively bigger or smaller sizes might be used. The sizes might be designated by a master node.

A given send slot may be designated relatively larger in a big MTU 1102 or relatively smaller in a small MTU 1106. Collectively, use of one or more big MTUs 1102 may yield a relatively larger maximum bus cycle time 1104. Conversely, use of one or more small MTUs 1102 may yield a relatively shorter maximum bus cycle time 1108. In one embodiment, all send slots of a given cycle may be of a same MTU length. In another embodiment, send slots of a given cycle may vary according to a given node.

For example, a node that has been assigned multiple identifiers in FIG. 10 may be given a small MTU 1106. Other nodes may be given a big MTU 1102.

What is claimed is:

1. A 10SPE network node, comprising:
 a processor;
 a memory;
 instructions in the memory configured to cause the processor to generate data to be sent to other nodes; and
 a network stack including circuitry configured to:
  send the data in one or more transmission cycles, wherein a given transmission cycle is of variable length and includes a least one send slot for each of a plurality of 10SPE network nodes to send data;
  delay transmission of data in a first send slot in a first transmission cycle until a second send slot based upon a bandwidth sharing scheme, wherein the circuitry is further configured to delay transmission of data in the first send slot based upon a count of transmission cycles;
  delay transmission of data in the first send slot based upon a credit accounting scheme, wherein sending data costs a plurality of credits and credits accrue over time.

2. The 10SPE network node of claim 1, wherein the circuitry is further configured to delay transmission of data in the first send slot based upon a count of send slots for the 10SPE network node.

3. The 10SPE network node of claim 1, wherein the transmission cycle includes a plurality of send slots of the 10SPE network.

4. The 10SPE network node of claim 1, wherein the first send slot and a second slot are of different sizes.

5. The 10SPE network node of claim 1, wherein the circuitry is further configured to delay transmission of data in the first send slot until the second send slot based upon another 10SPE network node previously sending data.

6. The 10SPE network node of claim 1, wherein the circuitry is further configured to delay transmission of data in the first send slot until the second send slot based upon the 10SPE network node having a lower priority than one of the other nodes.

7. The 10SPE network node of claim 1, wherein the instructions are further configured to cause the processor to a delay of transmission of data in a first send slot in a first transmission cycle until the second send slot based upon a determination of inactivity at the other nodes.

8. The 10SPE network node of claim 1, wherein the circuitry is implemented by instructions to be executed by the processor.

9. A method, comprising:
 generate data to be sent to other nodes;
 sending the data in one or more transmission cycles, wherein a given transmission cycle is of variable length and includes a least one send slot for each of a plurality of 10SPE network nodes to send data;
 delaying transmission of data in a first send slot in a first transmission cycle until a second send slot based upon a bandwidth sharing scheme, based upon a count of transmission cycles; and
 delaying transmission of data in the first send slot based upon a credit accounting scheme, wherein sending data costs a plurality of credits and credits accrue over time.

10. The method of claim 9, further comprising delaying transmission of data in the first send slot based upon a count of sending slots for the 10SPE network node.

11. The method of claim 9, wherein the transmission cycle includes a plurality of send slots of the 10SPE network.

12. The method of claim 9, wherein the first send slot and a second slot are of different sizes.

13. The method of claim 9, further comprising delaying transmission of data in the first send slot until the second send slot based upon another 10SPE network node previously sending data.

14. The method of claim 9, further comprising delaying transmission of data in the first send slot until the second send slot based upon the 10SPE network node having a lower priority than one of the other nodes.

15. The method of claim 9, further comprising delaying of transmission of data in a first send slot in a first transmission cycle until the second send slot based upon a determination of inactivity by the other nodes.

16. The method of claim 9, wherein the method is implemented by instructions to be executed by a processor.

* * * * *